United States Patent
Yamaguchi et al.

(10) Patent No.: US 8,662,483 B2
(45) Date of Patent: Mar. 4, 2014

(54) SHOCK ABSORBER FOR VEHICLE SEAT

(75) Inventors: Shigetomo Yamaguchi, Toyota (JP); Masayuki Kitou, Nagoya (JP); Toshiyuki Ario, Oogaki (JP); Ryuji Hayashi, Nagoya (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 521 days.

(21) Appl. No.: 12/626,699

(22) Filed: Nov. 27, 2009

(65) Prior Publication Data
US 2010/0133732 A1 Jun. 3, 2010

(30) Foreign Application Priority Data
Nov. 28, 2008 (JP) ................................. 2008-303964

(51) Int. Cl.
*F16F 7/00* (2006.01)
*B60N 2/42* (2006.01)

(52) U.S. Cl.
USPC ........ 267/140.4; 267/102; 267/103; 267/107; 267/110; 267/131; 267/142; 267/144; 267/158; 297/216.1; 297/284.1; 297/284.2; 297/284.4; 297/284.9; 297/452.18; 297/452.52; 297/452.55

(58) Field of Classification Search
USPC ........ 267/93, 140.4, 111, 112, 110, 131, 142, 267/81, 95, 199, 106, 107; 297/452.52, 297/284.1–284.4, 452.49, 344.15
See application file for complete search history.

(56) References Cited

U.S. PATENT DOCUMENTS

| 4,357,005 | A | * | 11/1982 | Bourke ......................... 267/144 |
| 4,415,147 | A |   | 11/1983 | Biscoe et al. |
| 4,606,532 | A | * | 8/1986  | Kazaoka et al. .............. 267/102 |
| 4,973,032 | A | * | 11/1990 | Fourrey et al. ................ 267/144 |
| 6,412,874 | B1| * | 7/2002  | Mayer ........................ 297/452.52 |
| 7,036,864 | B2| * | 5/2006  | Rehfuss et al. ................. 296/63 |
| 7,775,603 | B2| * | 8/2010  | Mundell et al. .......... 297/452.52 |
| 2006/0138831 | A1 | * | 6/2006 | McMillen et al. ......... 297/284.1 |
| 2008/0001464 | A1 | * | 1/2008 | Mundell et al. .......... 297/452.52 |

FOREIGN PATENT DOCUMENTS

EP 1593547 11/2005
JP 2007-313045 12/2007

OTHER PUBLICATIONS

Japan Office action, dated Jan. 10, 2013 along with an english translation thereof.

* cited by examiner

*Primary Examiner* — Robert A Siconolfi
*Assistant Examiner* — San Aung
(74) *Attorney, Agent, or Firm* — Greenblum & Bernstein, P.L.C.

(57) ABSTRACT

A shock absorber for vehicle seat is provided. The shock absorber is suspended on a seat frame so as to elastically support a pad. The shock absorber includes: a plurality of wires that are disposed in parallel to the seat frame, both ends of the wires being locked to the seat frame; and a resinous member that connects the wires to each other, the resinous member having a bent portion, wherein the resinous member is elastically deformable in a direction in which the wires are opposed each other in accordance with a deformation of the bent portion.

18 Claims, 8 Drawing Sheets

SHOCK ABSORBER FOR VEHICLE SEAT

CROSS REFERENCE TO RELATED APPLICATION

The present application claims priority from Japanese Patent Application No. 2008-303964, which was filed on Nov. 28, 2008, the disclosure of which is herein incorporated by reference in its entirety.

TECHNICAL FIELD

The present invention relates to a shock absorber for vehicle seat, the shock absorber is suspended on a seat frame so as to elastically support a pad.

BACKGROUND

In general, a vehicle seat mounted to a vehicle such as an automobile includes a rectangular seat frame, a pad which is attached to the seat frame, and a shock absorber which is disposed on a rear surface of the pad so as to be suspended on the seat frame. When the pad is elastically deformed, the shock absorber elastically supports the pad so as to alleviate a shock which may be transmitted to a person sitting on the seat. The shock absorber includes, for example, a plurality of wires having both ends locked to the seat frame and resinous members connecting the plurality of wires disposed in parallel (see Patent Document 1). In addition, the resinous members regulate the wires from moving close to each other or moving away from each other so as to ensure a shock absorbing performance of the shock absorber.

[Patent Document 1] JP-A-2007-313045

SUMMARY

However, the above described resinous members linearly connect the wires to each other. In addition, the resinous members are generally contracted by heat, and are contracted with time due to heat, so that the wires are pulled to each other. As a result, in the resinous members, an attachment portion attached to the wires becomes gradually brittle, and the strength of the attachment portion is weakened, thereby deteriorating the durability thereof. Therefore, an object of the invention is to provide a shock absorber for vehicle seat which has high durability.

According to a first aspect of the present invention, there is provided a shock absorber for vehicle seat, the shock absorber suspended on a seat frame so as to elastically support a pad, the shock absorber comprising: a plurality of wires that are disposed in parallel to the seat frame, both ends of the wires being locked to the seat frame; and a resinous member that connects the wires to each other, the resinous member having a bent portion, wherein the resinous member is elastically deformable in a direction in which the wires are opposed each other in accordance with a deformation of the bent portion.

Further, according to another aspect of the present invention, there is provided a vehicle seat comprising: a seat frame; a pad that is provided on the seat frame; and a shock absorber that is suspended on the seat frame so as to elastically support the pad, the shock absorber provided between the seat frame and the pad, the shock absorber comprising: a plurality of wires that is disposed in parallel to the seat frame, both ends of the wires being locked to the seat frame; and a resinous member that connects the wires to each other, the resinous member having a bent portion, wherein the resinous member is elastically deformable in a direction in which the wires are opposed each other in accordance with a deformation of the bent portion.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE PRESENT INVENTION

Figure 1:
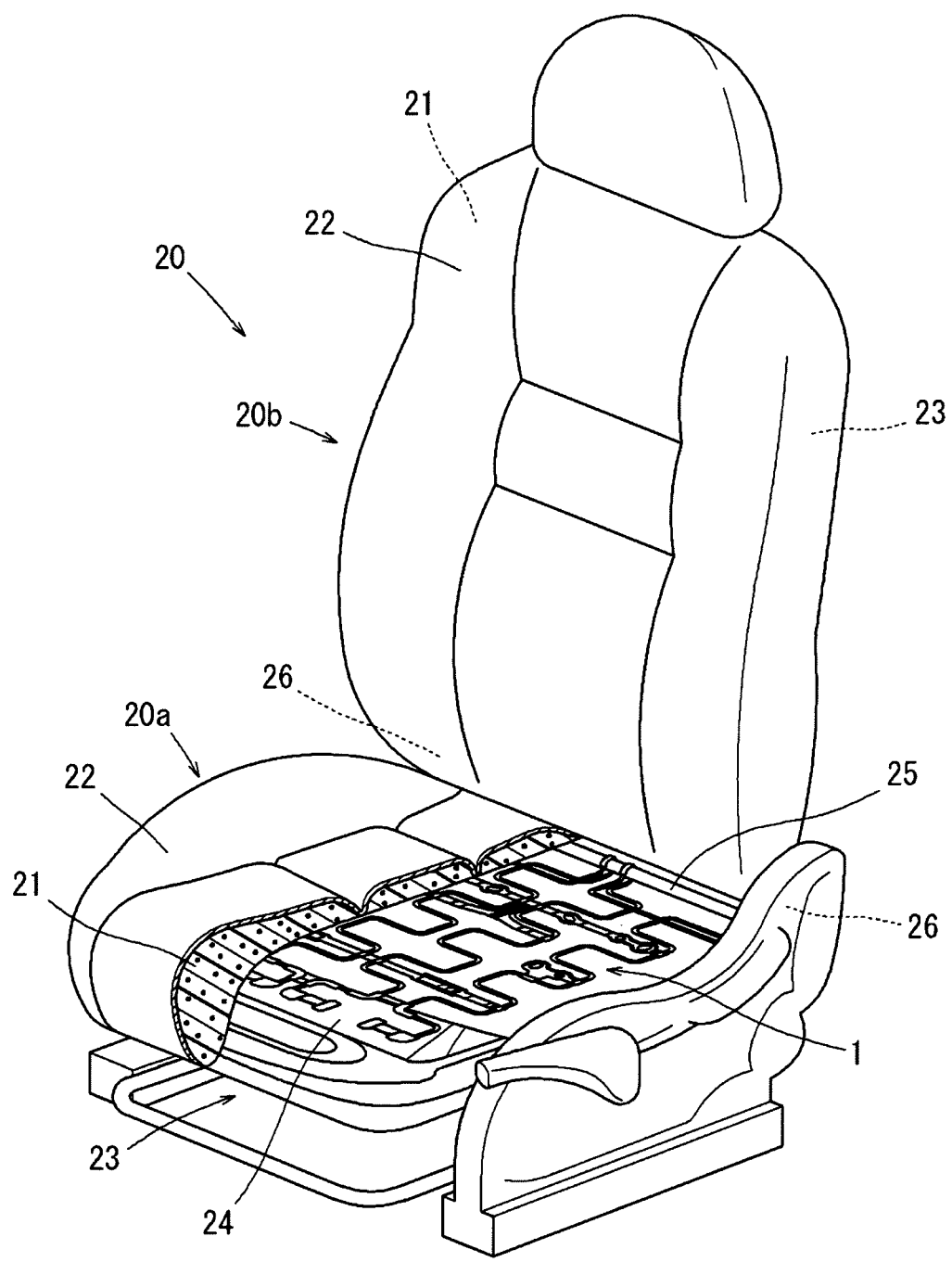
FIG. 1 is a perspective view illustrating a part of a section of a vehicle seat.

An exemplary embodiment of the invention will be described with reference to FIGS. 1 to 13. As shown in FIG. 1, a seat 20 is a seat mounted to a vehicle such as an automobile, and includes a seat cushion 20a and a seat back 20b which is rotatably connected to the seat cushion 20a. Each of the seat cushion 20a and the seat back 20b includes a seat frame 23, a pad 21 which is mounted to the seat frame 23, and a surface skin 22 which covers a surface of the pad 21. The pad 21 is formed of resin foam such as urethane foam.

As shown in FIG. 1, the seat frame 23 of the seat cushion 20a is formed in a rectangular shape, and includes a plate-shaped plate member 24 which is disposed at the front position of the seat, a cylindrical bar 25 which is disposed at the rear position of the seat, and plate-shaped side frames 26 which are disposed on both left and right positions of the seat. A shock absorber 1 disposed on the rear surface (lower surface) of the pad 21 is bridged between the plate member 24 and the bar 25.

Figure 2:
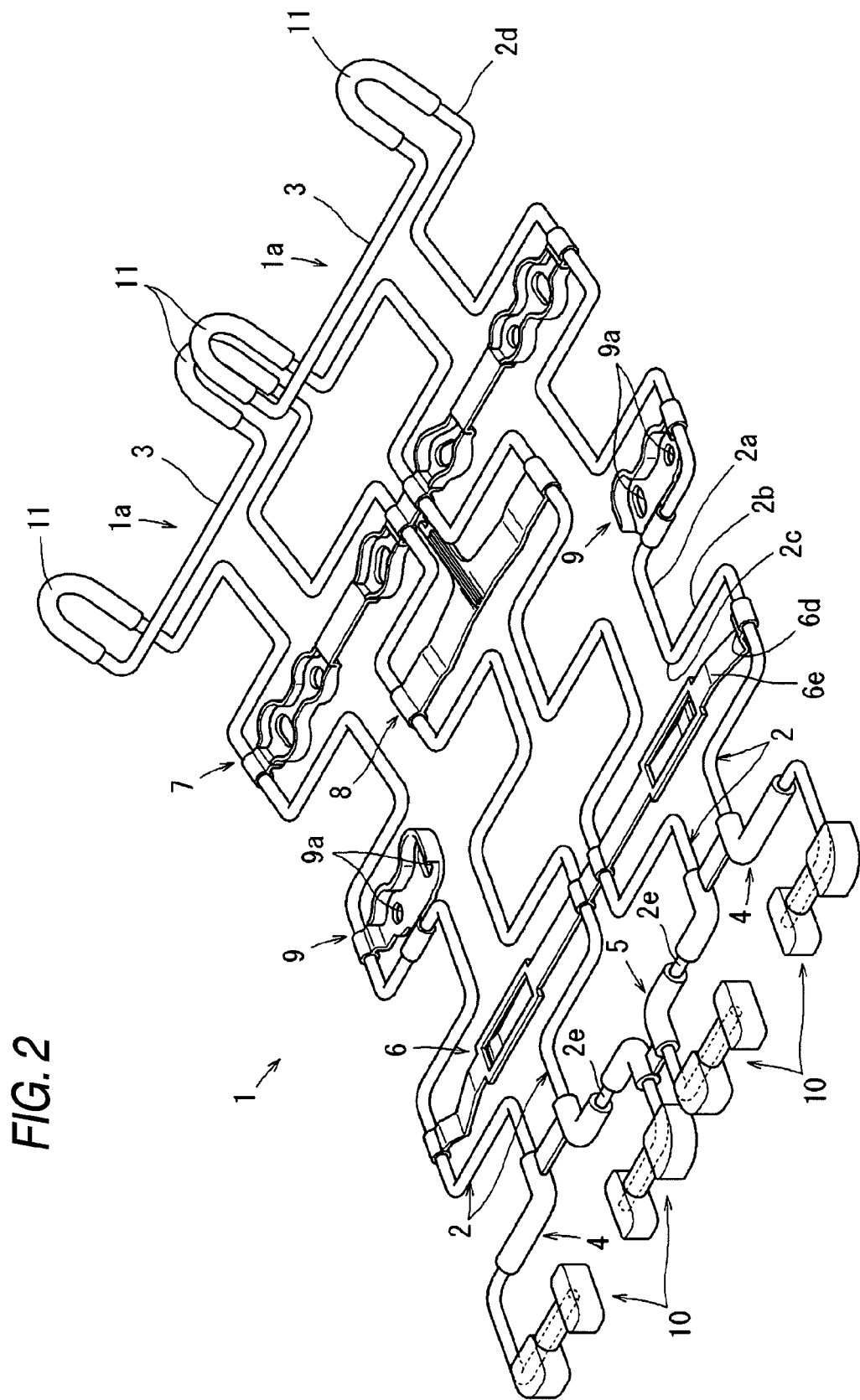
FIG. 2 is a perspective view illustrating a shock absorber.
Figure 3:
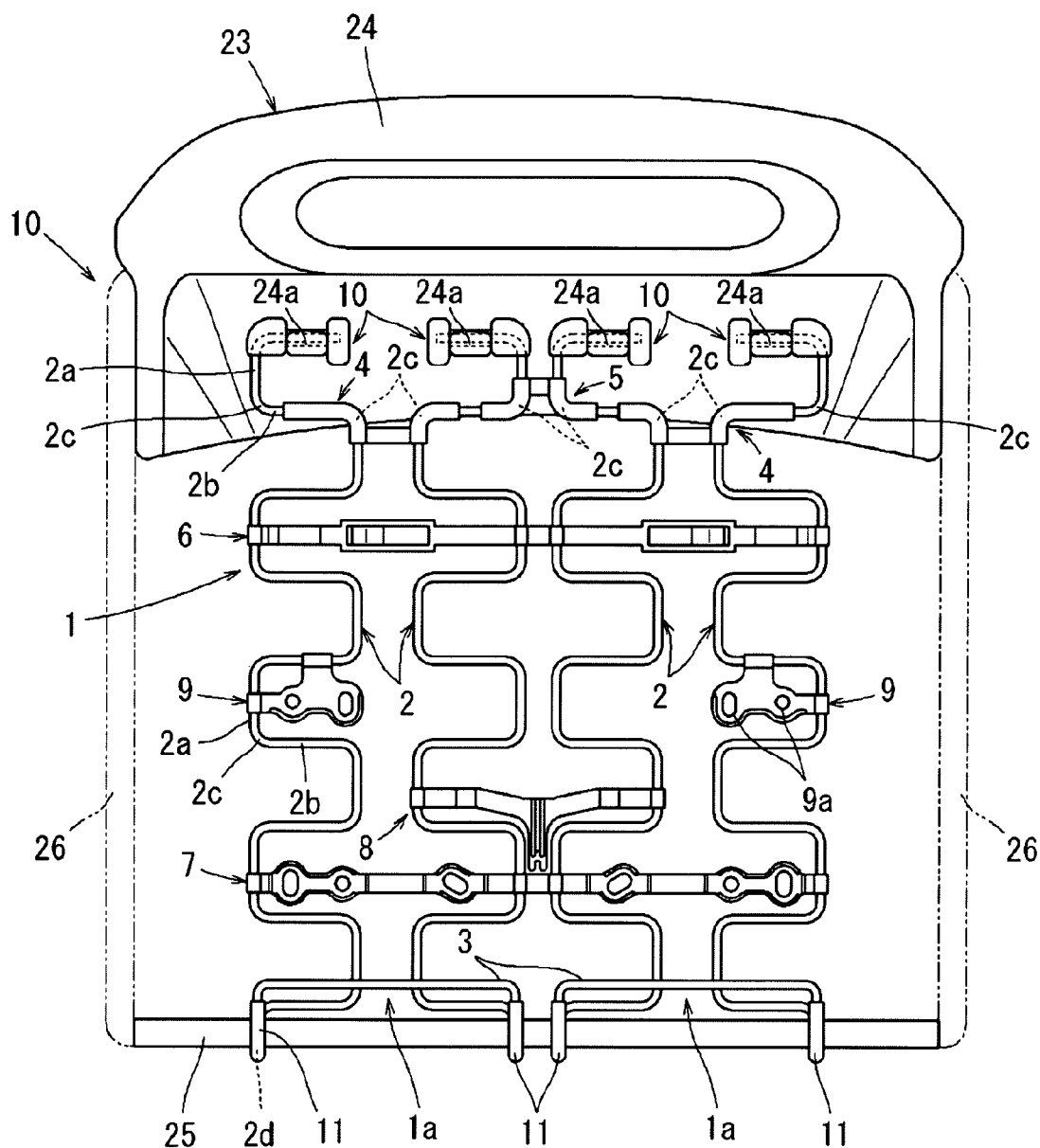
FIG. 3 is a plan view illustrating the shock absorber and a seat frame.

As shown in FIG. 1, the shock absorber 1 is disposed on the rear surface of the pad 21, and elastically supports the pad 21 when the pad 21 is elastically deformed. Accordingly, the shock absorber 1 alleviates a shock which may be transmitted to a person sitting on the seat 20. As shown in FIGS. 2 and 3, the shock absorber 1 integrally includes elastic metallic springs 1a and plural resinous members 4 to 11. Each of the springs 1a integrally includes a pair of wires 2 disposed in parallel and a connection wire 3 connecting one ends of the wires 2 to each other.

The wire 2 includes a longitudinal extension portion 2a which extends in the longitudinal direction (the vertical direction in FIG. 3) and a transverse extension portion 2b which extends in the transverse direction (the horizontal direction in FIG. 3) substantially perpendicular to the longitudinal extension portion 2a, where the longitudinal extension portion 2a and the transverse extension portion 2b are alternately arranged. A wire bent portion 2c is provided between the longitudinal extension portion 2a and the transverse extension portion 2b so as to connect them each other. One end of the wire 2 is provided with a hook 2d which is locked to a bar 25. The hook 2d extends upward in a circular arc shape. The connection wire 3 extends in the transverse direction between the pair of hooks 2d so as to connect them each other.

Figure 5:
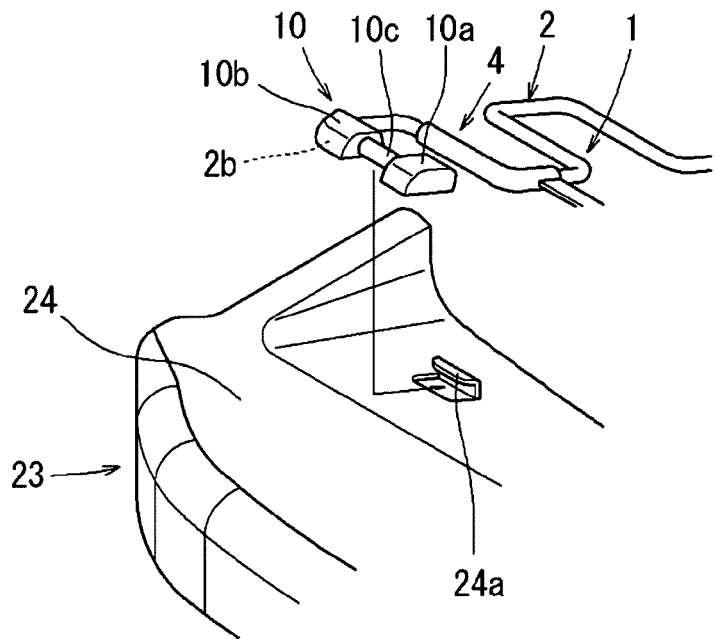
FIG. 5 is an enlarged perspective view illustrating a part of the shock absorber and the seat frame in the state where the shock absorber is locked to the seat frame.

Each of the resinous members 4 to 11 is formed of a resin such as polypropylene, and desirably a resin such as polyacetal having high creep resistance. The resinous members 4 to 11 are integrally molded with the springs 1a through an injection molding process in the state where the springs 1a are set in a mold (see FIGS. 2 and 3). The resinous member 10 is provided in the foremost transverse extension portion 2b of the wire 2. As shown in FIG. 5, the resinous member 10 includes a pair of support portions 10a and 10b enclosing both ends of the transverse extension portion 2b, and an attachment portion 10c enclosing the center of the transverse extension portion 2b. The attachment portion 10c is locked to a claw 24a which is cut and formed upright from the plate member 24 of the seat frame 23.

Figure 6:
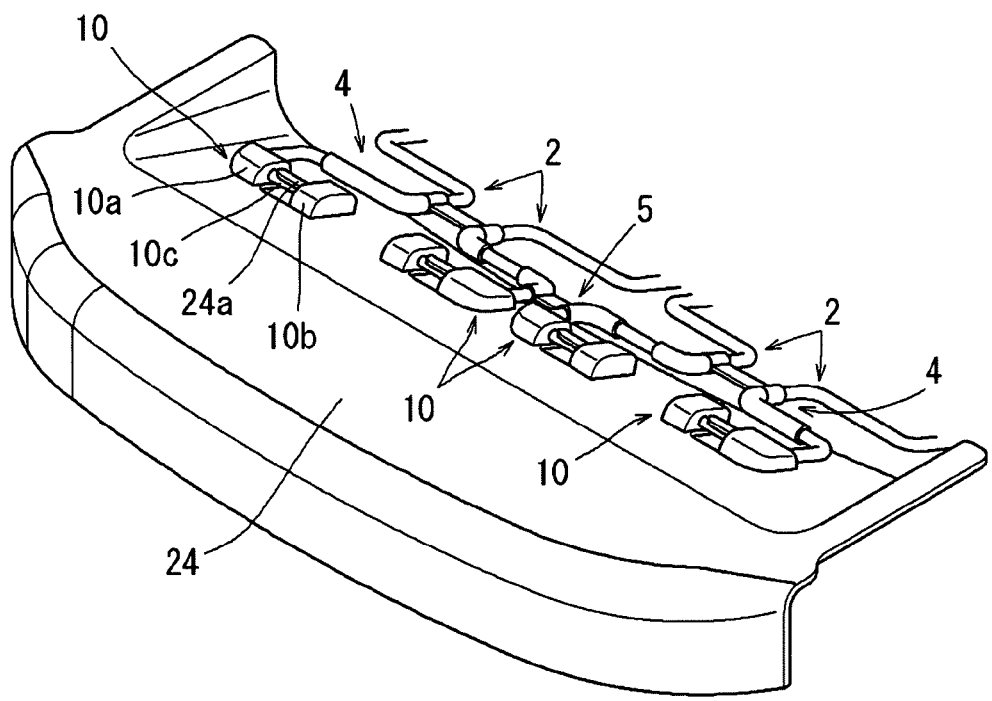
FIG. 6 is an enlarged perspective view illustrating a part of the shock absorber and the seat frame.

As shown in FIG. 6, the pair of support portions 10a and 10b is disposed on both sides of the claw 24a. Accordingly, the wire 2 is regulated by the support portions 10a and 10b so as not to move in the transverse direction with respect to the plate member 24. In addition, each of the support members 10a and 10b has a diameter larger than that of the attachment portion 10c, and a height higher than that of the claw 24a. Accordingly, the claw 24a is prevented from being brought into contact with the pad 21 by the support portions 10a and 10b. As a result, it is possible to prevent the pad 21 from being broken by the claw 24a by using the support portions 10a and 10b.

As shown in FIG. 2, the resinous member 11 encloses the hook 2d of the rear end of the wire 2. The resinous member 11 is locked to the bar 25 of the seat frame 23 together with the hook 2d in a direction from the lower side of the bar 25. Accordingly, the resinous member 11 prevents the metallic wire 2 and the bar 25 from directly coming into contact with each other, thereby preventing abnormal noise which may occur by the contact therebetween.

Figure 7:
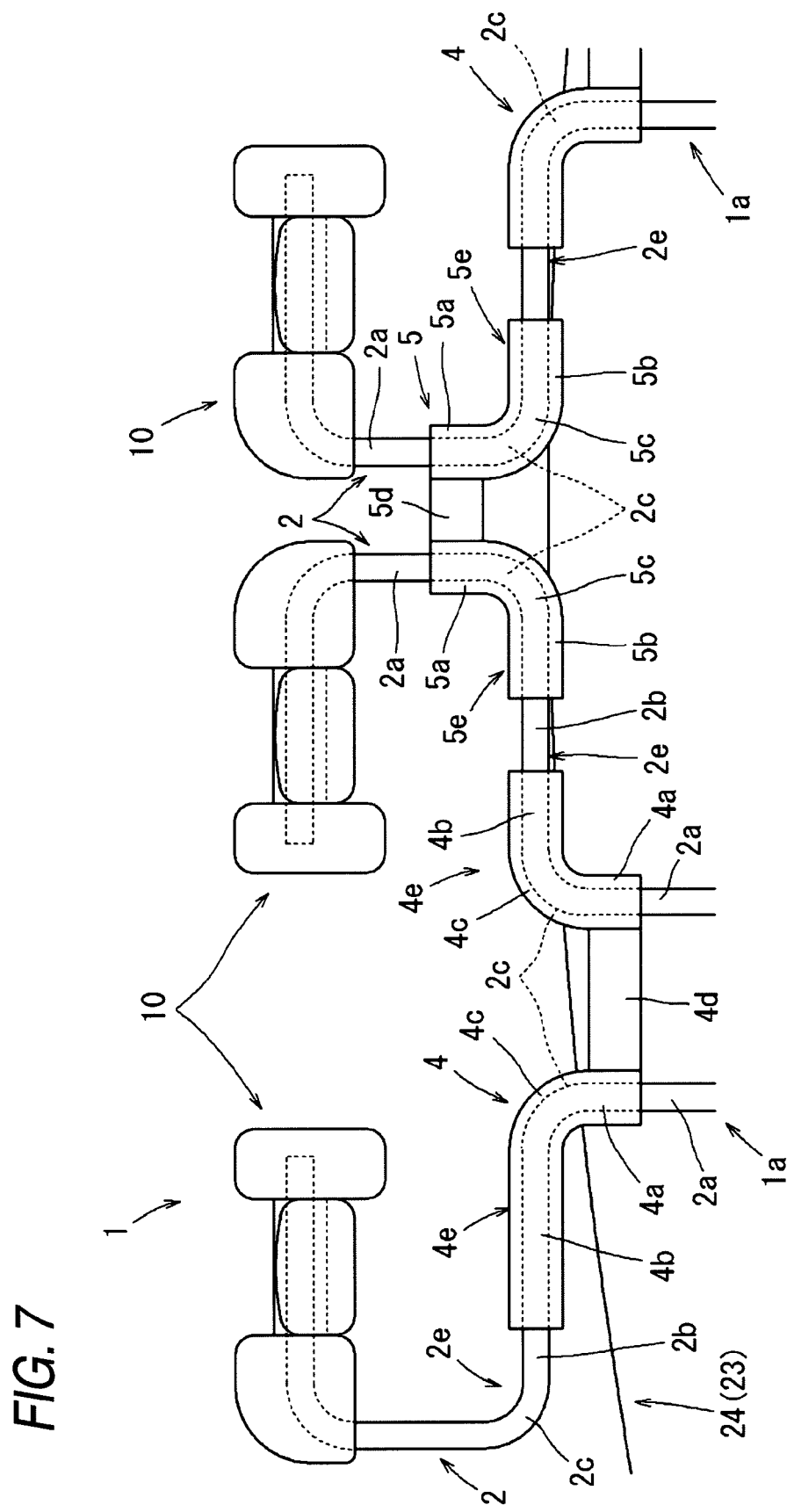
FIG. 7 is an enlarged plan view illustrating a part of the shock absorber and a plate member.

As shown in FIGS. 3 and 7, the resinous members 4 and 5 are provided in a front side portion of the wire 2. The resinous member 4 integrally includes a pair of enclosure bodies 4e which is respectively attached to the wires 2 and a connection portion 4d which connects the pair of enclosure bodies 4e to each other. Each of the enclosure bodies 4e is formed in a cylindrical shape, and includes a longitudinal enclosure portion 4a which encloses the second longitudinal extension portion 2a and a transverse enclosure portion 4b which encloses the second transverse extension portion 2b. A bent enclosure portion 4c enclosing the wire bent portion 2c is provided between the longitudinal enclosure portion 4a and the transverse enclosure portion 4b. The resinous member 4 has a configuration in which one wire bent portion 2c of each wire 2 is enclosed and plural wire bent portions 2c are not continuously enclosed. The connection portion 4d connects the pair of longitudinal enclosure portions 4a to each other at a position distant from the bent enclosure portion 4c.

As shown in FIG. 7, the resinous member 5 integrally includes a pair of enclosure bodies 5e which encloses a part of each wire 2 and a connection portion 5d which connects the pair of enclosure bodies 5e to each other. Each of the enclosure bodies 5e is formed in a cylindrical shape, and includes a longitudinal enclosure portion 5a which encloses the first longitudinal extension portion 2a and a transverse enclosure portion 5b which encloses the second transverse extension portion 2b. A bent enclosure portion 5c enclosing the wire bent portion 2c is provided between the longitudinal enclosure portion 5a and the transverse enclosure portion 5b. The resinous member 5 has a configuration in which one wire bent portion 2c of each wire 2 is enclosed and plural wire bent portions 2c are not continuously enclosed. The connection portion 5d connects the pair of longitudinal enclosure portions 4a to each other at a position distant from the bent enclosure portion 5c.

As shown in FIGS. 3 and 7, the resinous members 4 and 5 are placed on the plate member 24 together with the wire 2. Accordingly, the resinous members 4 and 5 prevent the wire 2 and the plate member 24 from directly coming into contact with each other, thereby preventing abnormal noise which may occur by the contact therebetween. In addition, the resinous members 4 and 5 respectively include the connection portions 4d and 5d connecting the pair of wires 2 to each other. Accordingly, the pair of wires 2 is connected to each other by the resinous member 4 and 5. An exposure portion 2e is provided between the resinous members 4 and 5 so as to expose a part of the wire 2 between the wire bent portions 2c. Accordingly, upon molding the resinous members 4 and 5 through an injection molding process, a corresponding portion of the wire 2 exposed by the exposure portion 2e can be held by a fixed pin.

Figure 8:
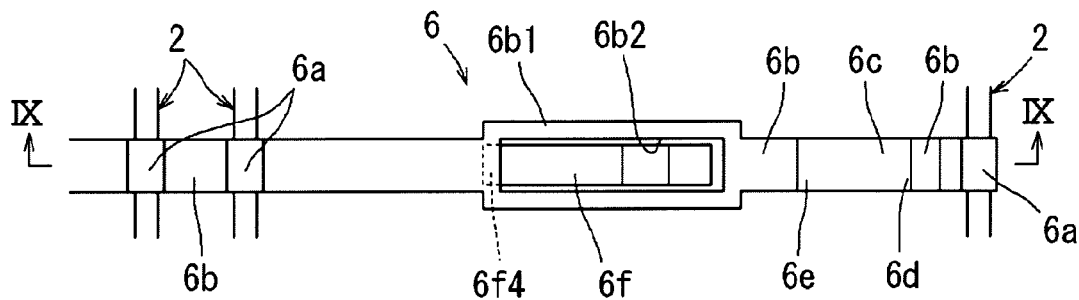
FIG. 8 is an enlarged plan view illustrating a part of a resinous member and a pair of wires.
Figure 9:
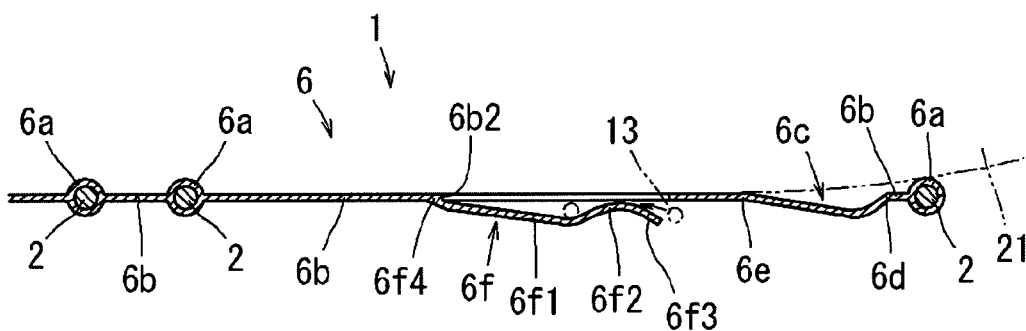
FIG. 9 is a sectional view taken along the line IX-IX in FIG. 8.

As shown in FIGS. 2 and 3, each of the resinous members 6 and 7 is formed in a thin plate shape, and is suspended on four wires 2. The resinous member 6 extends in the transverse direction at the front portion of the shock absorber 1. On the other hand, the resinous member 7 extends in the transverse direction at the rear portion of the shock absorber 1. As shown in FIGS. 8 and 9, the resinous member 6 includes attachment portions 6a which are attached to the wires 2, a first portion 6b which extends on a plane connecting the wires 2, recess portions 6c, and a hook 6f.

As shown in FIGS. 8 and 9, each of the attachment portions 6a encloses the wire 2. The recess portions 6c are provided in the course of the first portion 6b and both left and right sides of the resinous member 6 so as to protrude downward. Each of the recess portions 6c includes a pair of bent portions 6d and 6e bent downward from the first portion 6b so as to be distant from the pad 21. An inclined angle of the bent portion 6e with respect to the first portion 6b is smaller and gentler than that of the bent portion 6d. A wide portion 6b1 of the first portion 6b is provided at a position close to the gentle bent portion 6e. The wide portion 6b1 has a width wider than those of other portions of the first portion 6b, and has a notch portion 6b2 formed at the center thereof. The wide portion 6b1 is formed in an annular shape.

As shown in FIGS. 8 and 9, the wide portion 6b1 is provided with a hook 6f. The hook 6f extends outward in a cantilever shape from one end of the notch portion 6b2 close to the center of the shock absorber 1. The hook 6f includes a body portion 6f1 which obliquely extends downward from the first portion 6b, a fixing portion 6f2 which protrudes upward from the leading end of the body portion 6f1, and a receiving portion 6f3 which is bent downward from the leading end of the fixing portion 6f2. A bent portion 6e is located in the vicinity of the receiving portion 6f3 so as to substantially extend in parallel to the receiving portion 6f3 at a gentle angle.

As shown in FIG. 9, an electric wiring member 13 is caught by the hook 6f. As the method, first, the electric wiring member 13 is moved from the gentle bent portion 6e to the receiving portion 6f3. Accordingly, the hook 6f is elastically deformed, and the electric wiring member 13 is inserted into the body portion 6f1. The electric wiring member 13 is fixed to the body portion 6f1 through the fixing portion 6f2 when the hook 6f is elastically restored. A reinforcing portion 6f4 is provided between the base end of the hook 6f and the body portion 6f1 so as to thicken the hook 6f in the thickness direction. Accordingly, the strength of the hook 6f is improved.

Figure 10:
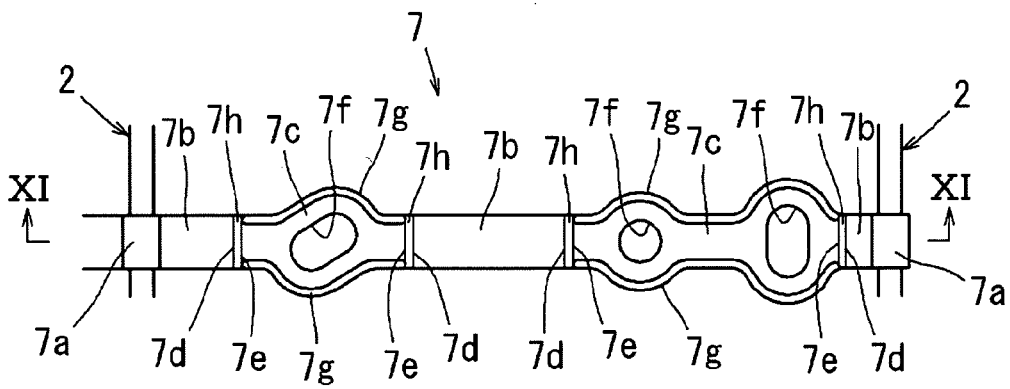
FIG. 10 is an enlarged plan view illustrating a part of another resinous member and the pair of wires.
Figure 11:
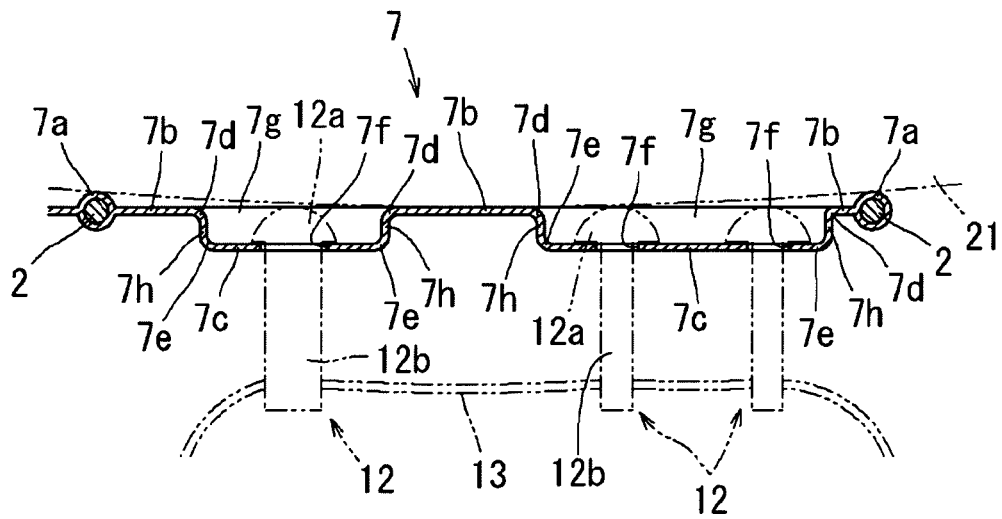
FIG. 11 is a sectional view taken along the line XI-XI in FIG. 10.

As shown in FIGS. 10 and 11, the resinous member 7 includes plural attachment portions 7a which are attached to the wires 2, plural first portions 7b which extend on a plane connecting the wires 2, and plural second portions 7c having a perforation hole. Each of the attachment portions 7a encloses the wire 2. Each of the second portions 7c extends at a position more distant from the pad 21 than the first portion 7b. A connection portion 7h is provided between the first portion 7b and the second portion 7c so as to connect them each other. A bent portion 7d is provided between the first portion 7b and the connection portion 7h so as to be bent downward from the first portion 7b. A bent portion 7e is provided between the second portion 7c and the connection portion 7h so as to be bent upward from the second portion 7c.

As shown in FIGS. 10 and 11, the width of the second portion 7c is wider than that of the first portion 7b. An annular attachment portion 7f having a perforation hole is provided in the second portion 7c. A clip 12 is attached to the attachment portion 7f, and the clip 12 integrally includes a head portion 12a and a bridge portion 12b. The head portion 12a is inserted into the perforation hole of the attachment portion 7f so as to be elastically attached to the attachment portion 7f. The bridge portion 12b includes a locking claw to which the wiring member 13 is locked. The head portion 12a of the clip 12 is provided between the pad 21 disposed above the resinous member 7 and the second portion 7c. Accordingly, the head portion 12a is disposed at a position where the pad 21 is not interfered with the head portion 12a.

As shown in FIGS. 10 and 11, the outer peripheral edge of the second portion 7c is provided with a rib 7g. Since the rib 7g is formed to have a height substantially the same as that of the first portion 7b, the pad 21 is not interfered with the rib 7b. Accordingly, the rigidity of the resinous member 7 is improved by the rib 7g. As a result, it is possible to sufficiently prevent the pad 21 from being largely pressed inward by means of the resinous member 7 when a user sits on the seat.

Figure 12:
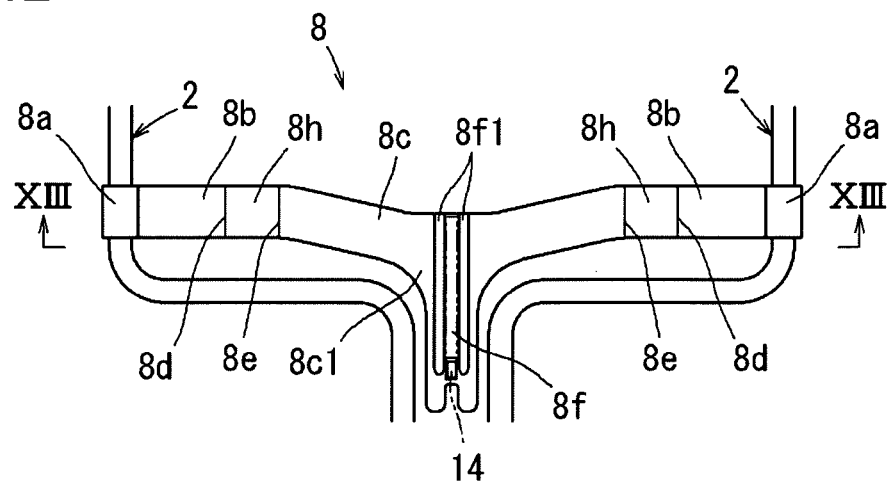
FIG. 12 is an enlarged plan view illustrating a part of another resinous member and the pair of wires.
Figure 13:
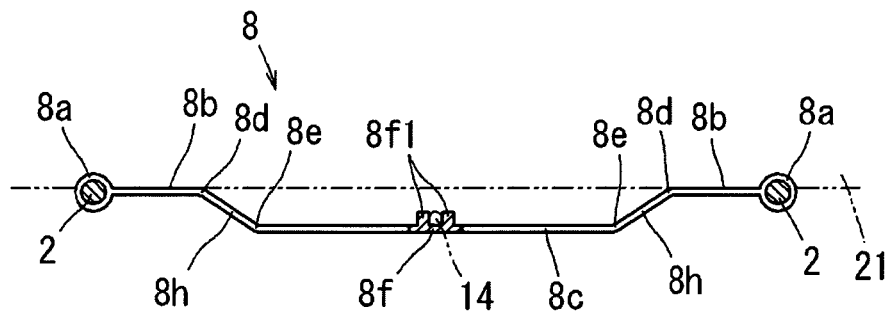
FIG. 13 is a sectional view taken along the line XIII-XIII in FIG. 12.

As shown in FIGS. 2 and 3, the resinous member 8 is formed in a thin plate shape, and is suspended on two central wires 2. As shown in FIGS. 12 and 13, the resinous member 8 includes an attachment portion 8a which is attached to the wire 2, a pair of first portions 8b, and a second portion 8c which is provided between the pair of first portions 8b. The attachment portion 8a encloses the wire 2. The first portions 8b extend on a plane connecting the wires 2. The second portion 8c extends at a position more distant from pad 21 than the first portions 8b. A connection portion 8h is provided between the first portion 8b and the second portion 8c so as to connect them each other. A bent portion 8d is provided between the first portion 8b and the connection portion 8h so as to be bent downward from the first portion 8b. A bent portion 8e is provided between the second portion 8c and the connection portion 8h so as to be bent upward from the second portion 8c.

As shown in FIGS. 12 and 13, the second portion 8c includes an extension portion 8c1 which extends backward. The extension portion 8c1 is provided with an attachment portion 8f having a pair of ribs 8f1. A sensor (pressure sensor) 14 is attached to the attachment portion 8f. The sensor 14 is provided between the second portion 8c and the pad 21 disposed above the resinous member 8. Accordingly, the sensor 14 is disposed at a position where the pad 21 is not interfered with the sensor 14. The sensor 14 is capable of detecting whether a user sits on the seat on the basis of a pressure applied from the pad 21 when the user sits on the seat.

Figure 4:
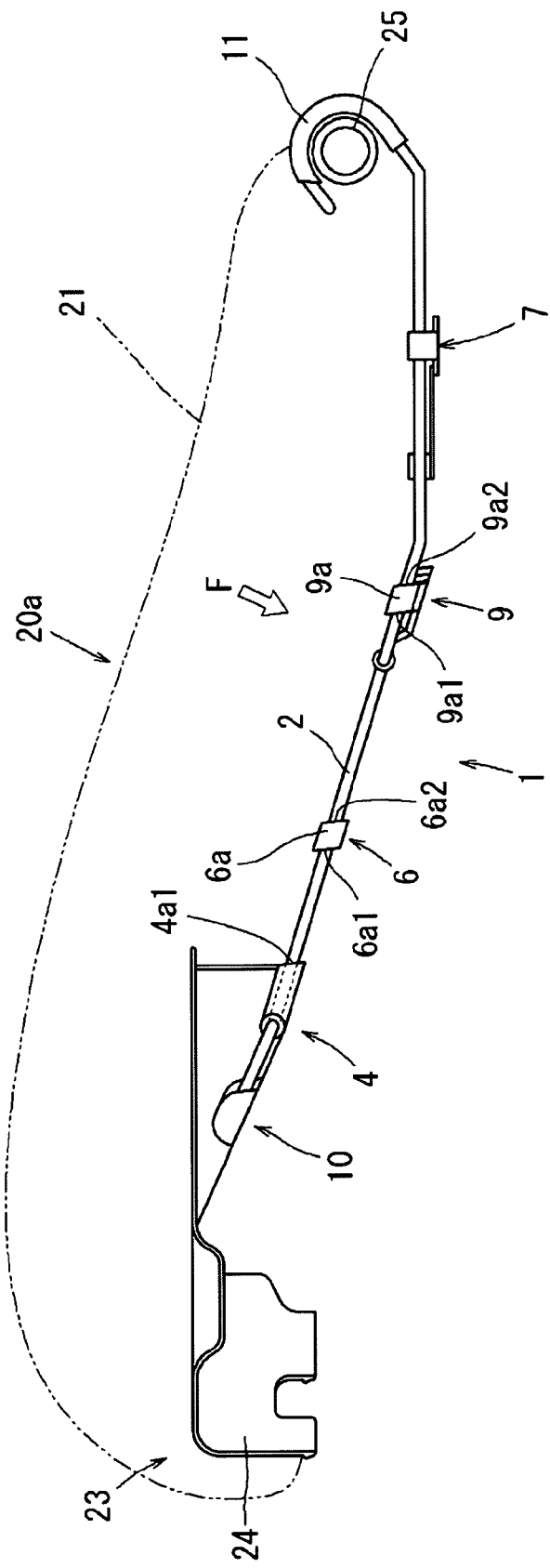
FIG. 4 is a left side view illustrating the shock absorber and the seat frame.

As shown in FIGS. 2 and 3, the resinous members 9 are disposed on both sides in the transverse direction of the shock absorber 1 and the center in the longitudinal direction thereof. Each of the resinous members 9 includes an attachment portion 9a which protrudes downward and has perforation holes for allowing the clip to be attached thereto. As shown in FIG. 4, the attachment portions 6a and 9a of the resinous members 6 and 9 respectively include inclined front surfaces 6a1 and 9a1 and rear surfaces 6a2 and 9a2. The front surfaces 6a1 and 9a1 and the rear surfaces 6a2 and 9a2 are inclined downward and backward. For this reason, when the user sits on the seat cushion 20a, a force F is applied from a user's thigh portion to the pad 21 in a forward and downward direction, and the rear surfaces 6a2 and 9a2 of the attachment portion 6a and 9a are inclined in a direction facing the force F. For this reason, the pad 21 is hardly torn by the attachment portions 6a and 9a.

As described above, as shown in FIGS. 8 to 13, the resinous members 6 to 8 are provided with the bent portions 6d to 8d and 6e to 8e. Then, the resinous members 6 to 8 are elastically deformable in a direction between the wires 2 by means of the bent portions 6d to 8d and 6e to 8e. Accordingly, when the resinous members 6 to 8 are contracted by a heat or the like, the resinous members 6 to 8 are elastically deformed about the vicinities of the bent portions 6d to 8d and 6e to 8e, and the lengths thereof in a direction between the wires 2 change. For this reason, when the resinous members 6 to 8 are contracted, the internal stress of the resinous members 6 to 8 may be dispersed by elastic deformation of the resinous members 6 to 8. Accordingly, since the stress of the attachment portions 6a to 8a of the resinous members 6 to 8 attached to the wires 2 is alleviated, it is possible to prevent the attachment portions 6a to 8a from being brittle. As a result, it is possible to improve the durability of the resinous members 6 to 8.

As shown in FIGS. 8 to 13, the resinous members 6 to 8 respectively include the first portions 6b to 8b which extend on a plane connecting the plural wires 2. The bent portions 6d to 8d of the resinous members 6 to 8 are respectively bent from the first portions 6b to 8b so as to be distant from the pad 21. Accordingly, since the bent portions 6d to 8d are bent to a position distant from the pad 21, the pad 21 is not interfered with the bent portions 6d to 8d. In addition, since the first portions 6b to 8b in the vicinities of the bent portions 6d to 8d are respectively located on a plane connecting the plural wires 2, when the wires 2 are pulled to be closer to each other, the portions other than the first portions 6b to 8b are deformed toward the first portions 6b to 8b, and are deformed in a region where the pad 21 is not interfered with the portions other than the first portions 6b to 8b. For this reason, even when the resinous members 6 to 8 are deformed, the pad 21 is not interfered with the resinous members 6 to 8.

As shown in FIGS. 10 to 13, the resinous members 7 and 8 respectively include the pair of first portions 7b and 8b, the second portions 7c and 8c, the connection portions 7h and 8h respectively connecting the first portions 7b and 8b to the second portions 7c and 8c. The bent portions 7d, 7e, 8d, and 8e are respectively provided between the first portions 7b and 8b and the connection portions 7h and 8h and between the second portions 7c and 8c and the connection portions 7h and 8h. Accordingly, the resinous members 7 and 8 are deformable in the vicinities of the plural bent portions 7d, 7e, 8d, and 8e. In addition, since the first portions 7b and 8b of the resinous members 7 and 8 are located on a plane connecting the plural wires 2, the resinous members 7 and 8 are elastically deformed in a direction between the wires 2 when the second portions 7c and 8c are respectively deformed to be close to the first portions 7b and 8b from the position distant from the pad 21. For this reason, even when the resinous members 7 and 8 are elastically deformed, the pad 21 is not interfered with the resinous members 7 and 8.

As shown in FIGS. 10 to 13, the second portions 7c and 8c of the resinous members 7 and 8 are respectively provided with the attachment portions 7f and 8f to which the clip 12 or the sensor 14 is attached. The head portion 12a of the clip 12 or the sensor 14 is provided between the pad 21 and the second portions 7c and 8c. Accordingly, since the second portions 7c and 8c are located at a position more distant from the pad 21 than the first portions 7b and 8b, the resinous members 7 and 8 are capable of forming a gap between the pad 21 and the second portions 7c and 8c. In addition, the head portion 12a of the clip 12 or the sensor 14 is disposed in the gap. For this reason, the pad 21 is not interfered with the head portion 12a of the clip 12 or the sensor 14.

As shown in FIGS. 10 and 11, the outer peripheral edge of the second portion 7c of the resinous member 7 is provided with the rib 7g. The height of the rib 7g is set to be substantially the same as that of a plane which protrudes from the outer peripheral edge and in which the first portion 7b is located. Accordingly, since the height of the rib 7g is substantially the same as that of the plane where the first portion 7b is located, the height of the rib 7g is sufficiently high without interfering with the pad 21. As a result, the strength of the second portion 7c becomes sufficiently strong.

As shown in FIG. 3, the resinous member 6 is provided at a position comparatively close to the front end of the wire 2 which is regulated from moving in the transverse direction by the claw 24a of the seat frame 23. Accordingly, even when the resinous member 6 is contracted by a heat or the like, the front end of the wire 2 hardly moves in the transverse direction. For this reason, a force generated by the contraction of the resinous member 6 is continuously applied to the resinous member 6 without being alleviated by the movement of the front end of the wire 2. However, the force can be alleviated by elastic deformation in the vicinities of the bent portions 6d and 6e of the resinous member 6 (see FIGS. 8 and 9). For this reason, the force concentrated on the attachment portion 6a of the resinous member 6 can be alleviated by elastic deformation of the resinous member 6.

OTHER EMBODIMENTS

The invention is not limited to the above-described embodiment, but may adopt the following configuration.

(1) The shock absorber 1 according to the above-described embodiment is provided in the rear surface (lower surface) of the pad 21 of the seat cushion 20a. However, the shock absorber 1 may be disposed in the rear surface of the pad 21 of the seat back 20b.

(2) The resinous members 6 to 8 according to the above-described embodiment are disposed in parallel in the pad 21 so as to have a thin plate shape, and the bent portions 6d to 8d and 6e to 8e are bent in the thickness direction of the pad 21. However, the resinous members may be formed upright in the pad so as to have a thin plate shape, the bent portions may be bent along the pad 21, and the resinous members may be elastically deformed in a direction between the wires by deforming the vicinities of the bent portions.

(3) Each of the resinous members 6 to 8 according to the above-described embodiment is formed in a thin plate shape, but may be formed in a bar shape.

(4) In the above-described embodiment, the resinous member 6 is provided at the front side portion of the shock absorber 1, and the resinous members 7 and 8 are provided at the rear side portion of the shock absorber 1. However, the resinous member 6 may be provided at the rear side portion of the shock absorber 1, and the resinous members 7 and 8 may be provided at the front side position thereof.

(5) The resinous member 7 according to the above-described embodiment includes the rib 7g, and the rib 7g is connected to the connection portion 7h. However, the rib 7g may not be connected to the connection portion 7h, so that the resinous member 7 is easily elastically deformable in a direction between the wires 2.

As described above, according to a first aspect of the present invention, there is provided a shock absorber for vehicle seat, the shock absorber suspended on a seat frame so as to elastically support a pad, the shock absorber comprising: a plurality of wires that are disposed in parallel to the seat frame, both ends of the wires being locked to the seat frame; and a resinous member that connects the wires to each other, the resinous member having a bent portion, wherein the resinous member is elastically deformable in a direction in which the wires are opposed each other in accordance with a deformation of the bent portion. Accordingly, in the case where the resinous member is contracted by heat or the like, the resinous member is elastically deformed about the vicinity of the bent portion, so that the length of the resinous member in a direction between the wires changes. For this reason, in the case where the resinous Member is contracted, the internal stress of the resinous member may be dispersed by elastic deformation of the resinous member. In this manner, since the stress concentrated on an attachment portion of the resinous member attached to the wire is alleviated, it is possible to prevent the attachment portion from being brittle. As a result, it is possible to improve the durability of the resinous member.

Further, according to a second aspect of the present invention, in addition to the first aspect, the resinous member includes a first portion that extends on a plane connecting the plurality of wires, and the bent portion of the resinous member is bent from the first portion so as to be distant from the pad. Accordingly, since the bent portion is bent to a position distant from the pad, the pad is not interfered with the bent portion. In addition, since the first portion in the vicinity of the bent portion is located on a plane connecting the plurality of wires, when the wires are pulled to each other, a portion other than the first portion is deformed toward the first portion in a region where the pad is not interfered with the portion other than the first portion. For this reason, even when the resinous member is elastically deformed, the pad is not interfered with the resinous member.

Further, according to a third aspect of the present invention, in addition to the first aspect, the resinous member includes: a pair of first portions that extends on a plane connecting the plurality of wires; a second portion that is disposed between the pair of first portions so as to be located at a position more distant from the pad than the first portions; and connection portions that connect the first portions to the second portion, and wherein bent portions are respectively provided between each first portion and each connection portion and between the second portion and each connection portion. Accordingly, the resinous member is capable of being deformed in the vicinities of the plurality of bent portions. In addition, since the first portion of the resinous member is located on a plane connecting the plurality of wires, when the second portion is deformed from the position distant from the pad toward the first portion, the resinous member is elastically deformed in a direction between the wires. For this reason, even when the resinous member is elastically deformed, the pad is not interfered with the resinous member.

According to a fourth aspect of the present invention, in addition to the third aspect, the second portion of the resinous member comprises an attachment portion to which a clip or a sensor is attached, and a head portion of the clip or the sensor is provided between the second portion and the pad. Accordingly, since the second portion is located at the position more distant from the pad than the first portion, the resinous member is capable of forming a gap between the second portion and the pad. In addition, the head portion of the clip or the sensor is disposed in the gap. For this reason, the pad is not interfered with the head portion of the clip or the sensor.

According to a fifth aspect of the present invention, in addition to the third aspect, an outer peripheral edge of the second portion of the resinous member comprises a rib, and a height of the rib is set to be substantially the same as that of a plane which protrudes from the outer peripheral edge and in which the first portion is located. Accordingly, since the height of the rib is substantially the same as that of the plane where the first portion is located, the rib is sufficiently high without interfering with the pad. Accordingly, the strength of the second portion becomes sufficiently strong.

According to a sixth aspect of the present invention, there is provided a vehicle seat comprising: a seat frame; a pad that is provided on the seat frame; and a shock absorber that is suspended on the seat frame so as to elastically support the pad, the shock absorber provided between the seat frame and the pad, the shock absorber comprising: a plurality of wires that is disposed in parallel to the seat frame, both ends of the wires being locked to the seat frame; and a resinous member that connects the wires to each other, the resinous member having a bent portion, wherein the resinous member is elastically deformable in a direction in which the wires are opposed each other in accordance with a deformation of the bent portion.

What is claimed is:

1. A shock absorber for vehicle seat, the shock absorber suspended on a seat frame so as to elastically support a pad, the shock absorber comprising:
    a plurality of wires that are disposed parallel to the seat frame and have longitudinally extending portions, both ends of the wires being locked to the seat frame; and
    a resinous member that extends in a direction transverse to the longitudinal direction of the wires and connects the longitudinally extending portions of the wires to each other, the resinous member having a bent portion, wherein
    the resinous member includes a first portion that extends in a plane connecting the plurality of wires in the transverse direction,
    the bent portion of the resinous member extends from the plane of the first portion so as to protrude away from the pad in a direction orthogonal to the plane of the first portion, the orthogonal direction being a thickness direction of the pad, and
    the resinous member is elastically deformable along the transverse direction in which the wires are opposed to each other in accordance with deformation of the bent portion.

2. A shock absorber for a vehicle seat, the shock absorber suspended on a seat frame so as to elastically support a pad, the shock absorber comprising:
    a plurality of wires that are disposed parallel to the seat frame and have longitudinally extending portions, both ends of the wires being locked to the seat frame; and
    a resinous member that extends in a direction transverse to the longitudinal direction of the wires and connects the longitudinally extending portions of the wires to each other, the resinous member including:
        a pair of first portions that extend in a plane connecting the plurality of wires in the transverse direction;
        a second portion that is spaced from the pair of first portions in a direction orthogonal to the plane connecting the plurality of wires in the transverse direction, and disposed between the pair of first portions in the traverse direction; and
        connection portions that connect the pair of first portions to the second portion in the orthogonal direction, wherein
        the pair of first portions are located between the pad and the second portion in the orthogonal direction, the orthogonal direction being a thickness direction of the pad,
        bent portions are respectively provided between each first portion and each connection portion and between the second portion and each connection portion, and
    the resinous member is elastically deformable along the traverse direction in which the wires are opposed to each other in accordance with a deformation of the bent portion.

3. The shock absorber according to claim 2,
    wherein the second portion of the resinous member comprises an attachment portion to which a clip or a sensor is attached, and wherein
    a head portion of the clip or the sensor is provided between the second portion and the pad.

4. The shock absorber according to claim 2,
    wherein an outer peripheral edge of the second portion of the resinous member comprises a rib, and wherein
    a height of the rib is substantially the same as that of a plane which protrudes from the outer peripheral edge and in which the pair of first portions are located.

5. A vehicle seat comprising:
    a seat frame;
    a pad that is provided on the seat frame; and
    a shock absorber that is suspended on the seat frame so as to elastically support the pad, the shock absorber provided between the seat frame and the pad, the shock absorber comprising:
        a plurality of wires that are disposed parallel to the seat frame have longitudinally extending portions, both ends of the wires being locked to the seat frame; and
        a resinous member that extends in a direction traverse to the longitudinal directions of the wires and connects longitudinally extending portions of the wires to each other, the resinous member having a bent portion, wherein
        the resinous member includes a first portion that extends in a plane connecting the plurality of wires in the traverse direction,
        the bent portion of the resinous member extends from the plane of the first portion so as to protrude from the pad in a direction orthogonal to the plane of the first portion, the orthogonal direction being a thickness direction of the pad, and the resinous member is elastically deformable along the traverse direction in which the wires are opposed to each other in accordance with deformation of the bent portion.

6. The shock absorber according to claim 3, wherein a portion of the clip or the sensor is provided between the second portion and the pad, in the thickness direction of the pad.

7. The shock absorber according to claim 1, wherein the longitudinally extending portions of the plurality of wires are spaced from each other by traverse portions, both the longitudinally extending portions of the wires and the traverse portions of the wires being disposed parallel to the seat frame.

8. The shock absorber according to claim 2, wherein the longitudinally extending portions of the plurality of wires are spaced from each other by traverse portions, both the longitudinally extending portions of the wires and the traverse portions of the wires being disposed parallel to the seat frame.

9. The vehicle seat according to claim 5, wherein the longitudinally extending portions of the plurality of wires are spaced from each other by traverse portions, both the longitudinally extending portions of the wires and the traverse portions of the wires being disposed parallel to the seat frame.

10. The shock absorber according to claim 1, the resinous member being positioned intermediate longitudinal end portions of the plurality of wires.

11. The shock absorber according to claim 2, the resinous member being positioned intermediate longitudinal end portions of the plurality of wires.

12. The vehicle seat according to claim 5, the resinous member being positioned intermediate longitudinal end portions of the plurality of wires.

13. The shock absorber according to claim 1, the bent portion being spaced from the longitudinally extending portions of the wires and from the ends of the resinous member.

14. The shock absorber according to claim 2, the bent portion being spaced from the longitudinally extending portions of the wires and from the ends of the resinous member.

15. The vehicle seat according to claim 5, the bent portion being spaced from the longitudinally extending portions of the wires and from the ends of the resinous member.

16. The shock absorber according to claim 1, further comprising a resinous member provided at each longitudinal end of the plurality of wires and distinct from the resinous member having a bent portion.

17. The shock absorber according to claim 2, further comprising a resinous member provided at each longitudinal end of the plurality of wires and distinct from the resinous member having a bent portion.

18. The vehicle seat according to claim 5, further comprising a resinous member provided at each longitudinal end of the plurality of wires and distinct from the resinous member having a bent portion.

* * * * *